Sept. 1, 1970  G. W. MISSON  3,526,490
METHOD OF BENDING GLASS ON FLUID SUPPORT
Original Filed Sept. 21, 1966  3 Sheets-Sheet 2

INVENTOR
GEORGE W. MISSON
BY
ATTORNEYS

Sept. 1, 1970          G. W. MISSON          3,526,490
METHOD OF BENDING GLASS ON FLUID SUPPORT
Original Filed Sept. 21, 1966          3 Sheets-Sheet 3
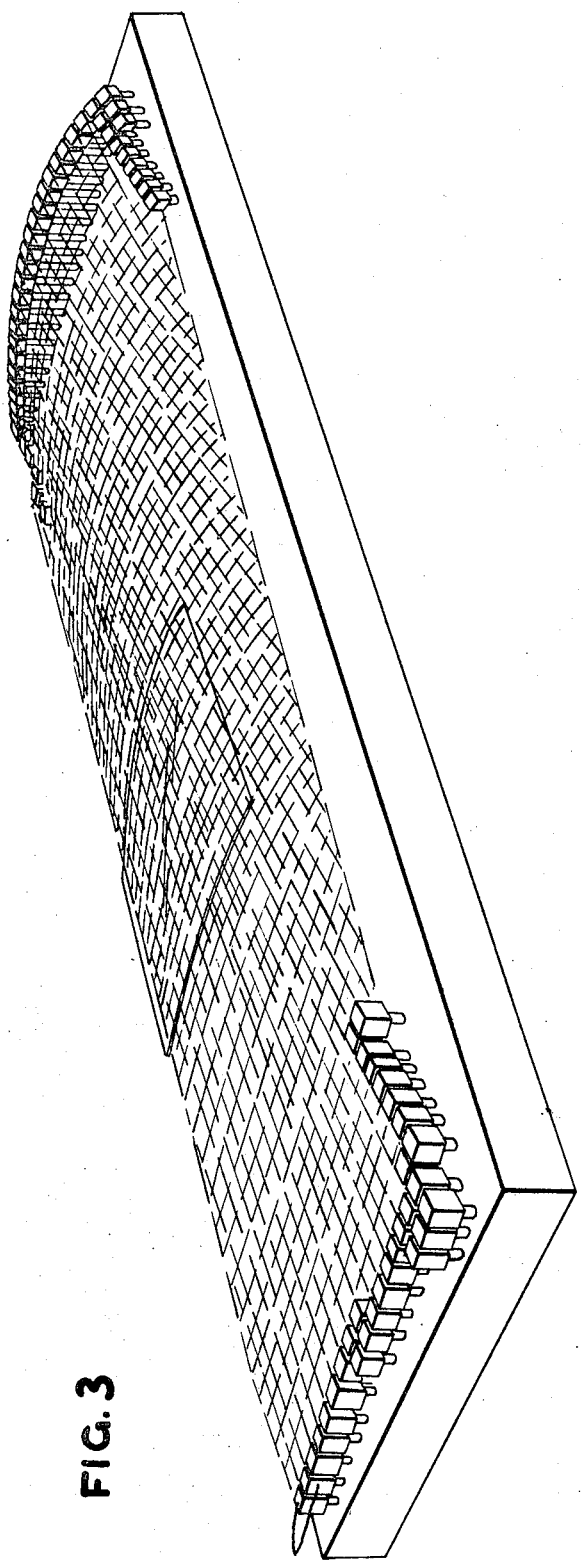
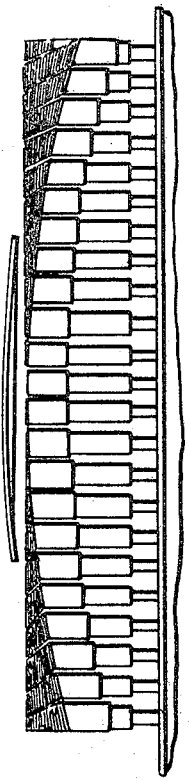
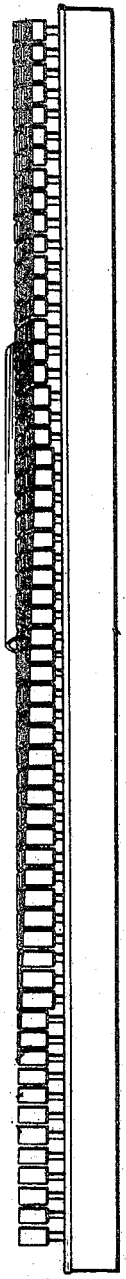
INVENTOR.
GEORGE W. MISSON
BY United States Patent Office 3,526,490
Patented Sept. 1, 1970

3,526,490
METHOD OF BENDING GLASS ON FLUID SUPPORT
George W. Misson, Pittsburgh, Pa., assignor to PPG Industries Inc., Pittsburgh, Pa., a corporation of Pennsylvania
Continuation of application Ser. No. 581,078, Sept. 21, 1966. This application May 9, 1969, Ser. No. 824,753
Int. Cl. C03b 23/02
U.S. Cl. 65—25                                             3 Claims

ABSTRACT OF THE DISCLOSURE

A glass sheet is heated to above deformation temperature and allowed to assume the contour of a support bed. It is thereafter transferred quickly to a cooling bed while the temperature of the glass is rapidly dropped below deformation temperature. The glass is moved so fast from the heating section to the quench that it only assumes partially the contour of the bed.

---

This application is a continuation of application Ser. No. 581,078, filed Sept. 21, 1966, now abandoned.

This invention relates to a method of bending glass on a fluid support, such as disclosed in U.S. Pat. 3,223,501 to Fredley et al., or on a porous bed hearth.

In previous art proposals, glass has been heated to a temperature above deformation temperature and allowed to assume the contour of a suitable support bed and thereafter transferred quickly to a cooling bed, at which time the temperature of the glass is rapidly dropped below its deformation temperature. The improvement of this invention contemplates the passage of the glass over the subsequent cooling section of the support bed at a speed so fast that the glass may assume partially the contour of the support bed.

The prior art beds ranged up to 60" in width. Of course, a sheet of glass conforming closely to the contour of the bed would assume a shape which would be approximately an arc of the circumference of a circle, the arc being determined by the contour of the bed. This invention provides a method of forming glass which has as one limit approximately a flat sheet and, as a second limit, the contour of the supporting bed. However, the glass may be "frozen" at some contour between the described limits. This permits a variety of curves to be formed into a sheet of glass under a fixed radius supporting bed.

A fuller and more complete understanding of the invention may be obtained by reading the specification in conjunction with the drawings, wherein;

FIG. 1A is another partly schematic perspective on a larger scale illustrating particularly how sheet glass parts are driven by discs contacting an edge of the part while it is otherwise supported entirely by a gas film over the inclined bed of FIG. 1;

FIG. 3 is a view of a bed with a glass sheet supported thereon;

FIG. 3A is a side elevation of the bed of FIG. 3 showing how the curve is developed along the path of travel of the glass;

FIG. 4 is an additional view of a bed showing the sheet partially assuming the contour of said bed;

Figure 1:
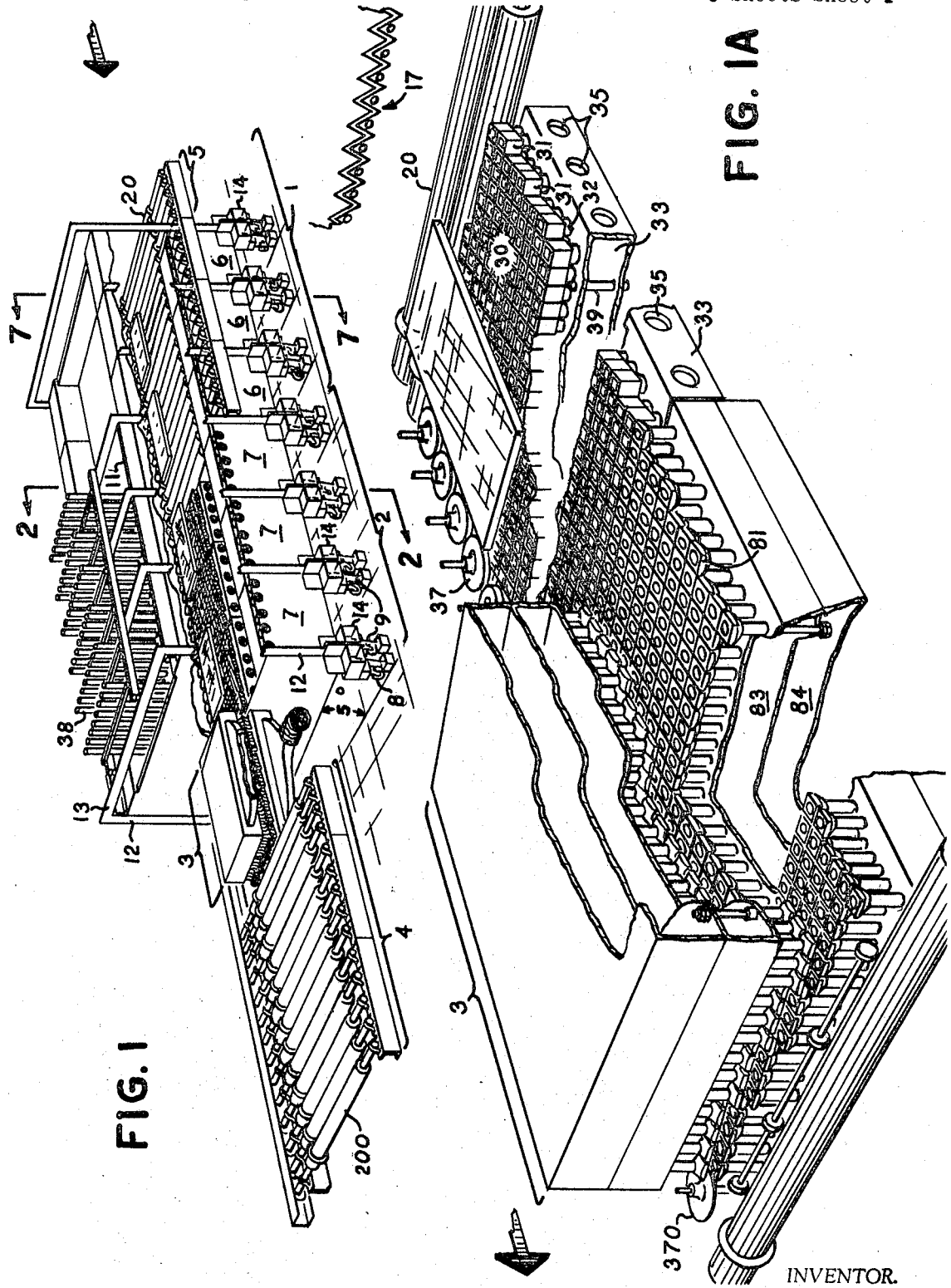
FIG. 1 shows a typical air support bed of the type disclosed by Fredley et al.
Figure 2:
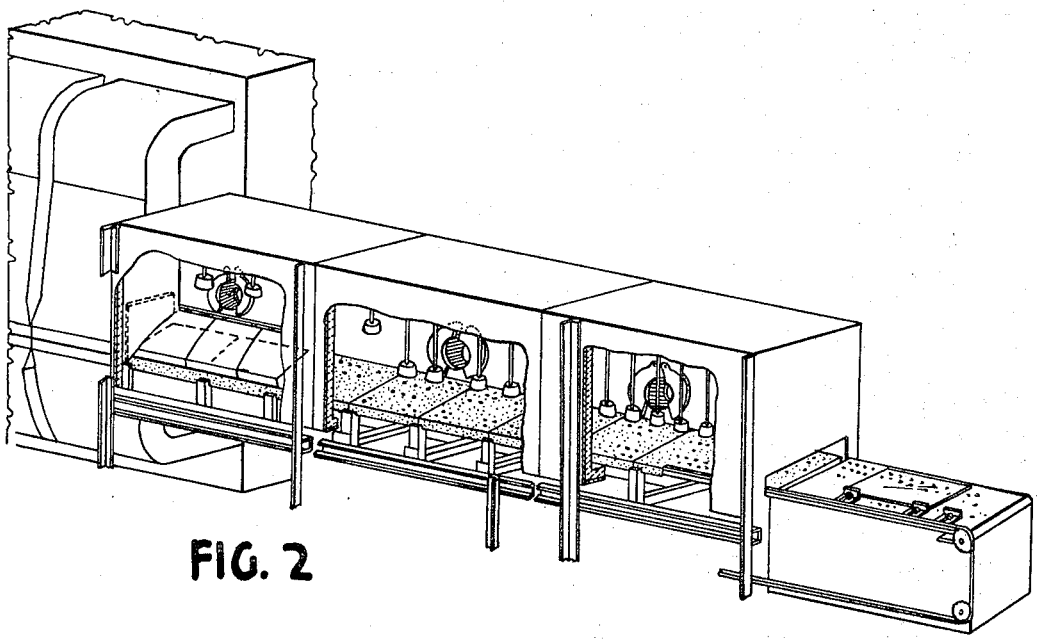
FIG. 2 shows a typical air support bed of the type disclosed by McMaster et al.

Referring to the drawings, FIG. 1 illustrates a system employed for heating flat glass parts up to or above the deformation temperature, i.e., to a temperature at which the glass can be subsequently tempered, quenching the glass while hot, and delivering the quenched curved glass onto a conveyor for removal. The components making up the complete system consist of a pre-heat section 1, wherein the glass is conveyed on rollers between radiant heaters to pre-heat the glass until brought to a suitable pre-heat temperature under the deformation temperature; a gas support heating section 2, where the glass parts are transferred to and partially supported on a hot gas bed, while being conveyed through a frictional drive, contacting the edges only of the glass parts. Supplemental heat is supplied above and below the glass until it reaches a temperature high enough for tempering purposes; a quenching section 3, wherein the glass is rapidly chilled while at least partially supported between opposed flowing films of cool air, edge contact driving being continued through the quench section; and a delivery system 4, which receives the glass parts from the quenching system.

A full description of a suitable heating and supporting section is given in U.S. Pat. 3,223,501.

OPERATION

The following is by way of example and of illustration of preferred methods of operation of the invention disclosed herein as applied to the treatment of glass sheets.

Sheets of glass ¼" in thickness and approximately 16" wide by 27" long are placed upon the conveyor leading to the heat section. As the leading edge of the glass sheet leaves the conveying section and progressively covers the supporting bed 30, the sheet becomes at least partially supported by the pressure of the gas emitting from the support bed. When the glass is heated to a deformation temperature, it is then transported quickly into the quenching section. In the quenching section, cool air is supplied to both major surfaces of the glass and the speed of the conveying means is adjusted to cause the glass to travel through the quench at a speed so fast that the glass assumes a contour only partially that contour of the supporting bed. Depending upon the regulation of the speed of travel, it is possible to cause the glass to "freeze" at an infinite variety of distances between the bed and a major surface of the glass. It can be seen that a large bed, say a bed having a radius of 60" or more, that it is possible to produce a curved sheet of glass which has an arc of a circle which is larger in radius than the radius of the supporting bed. This provides an inexpensive method of forming varying sheets of glass without providing corresponding contoured shaped beds.

Figure 5:
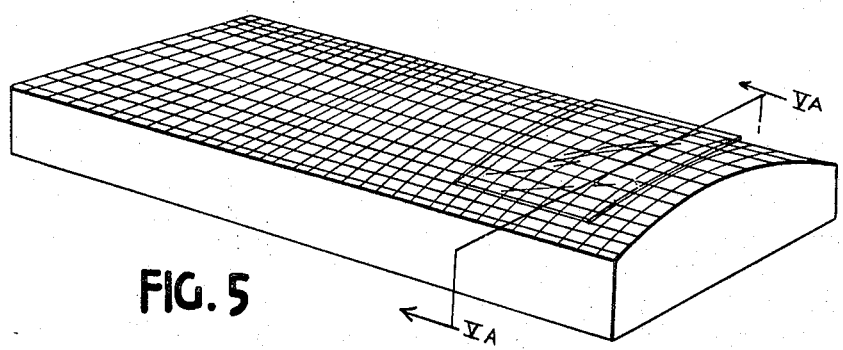
FIG. 5 is a cross section taken through FIG. 4 showing the glass sheet in relation to the bed.
Figure 5A:
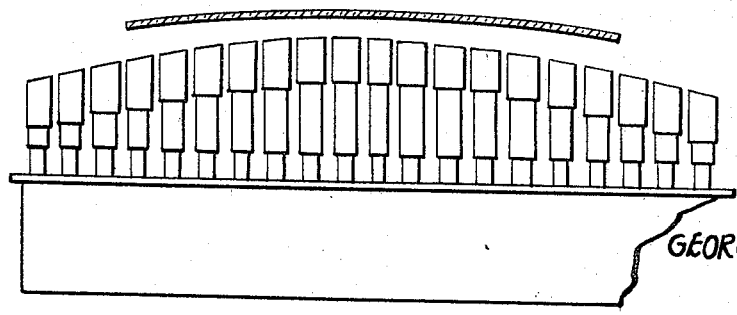
FIG. 5A is a schematic view of a portion of the gas support bed shown in FIG. 5, with a glass sheet supported thereabove adjacent the end of the bed.

As shown in FIG. 5, the glass is closely supported by the air support at the mid-line of the bed and at the edges of the glass near the edges of the bed. There is a greater distance between the glass and the bed than at the center line.

It is obvious that the foregoing description may be modified and, while certain preferred embodiments have been disclosed, alterations may be made therein without departing from the scope of the invention as set forth in the appended claims.

What is claimed is:
1. In a process of shaping glass, the steps comprising:
   (a) moving a glass sheet at deformation temperature over a gaseous support bed having a surface of increasing curvature that increases to a maximum curvature along the length thereof, said bed providing gaseous support for said sheet;
   (b) emitting cool gases from said support bed at a temperature sufficient to cool said glass sheet while moving over said bed;

(c) moving said sheet at a speed which is faster than the gravitational rate of downward movement of the unsupported portion of the sheet to assume only partially the transverse contour of said bed; and (d) cooling said sheet at a rate such that it reaches a rigid condition while in the shape of a desired partial contour over said bed.

2. A process of shaping glass sheets at deformation temperature by:

(a) supporting said sheet at said deformation temperature over a gaseous support bed having a surface of increasing curvature that increases to a maximum curvature along the length thereof;

(b) emitting cool gases from said support bed at a temperature sufficient to cool said glass sheet while supported over said bed;

(c) moving said sheet at a speed which is faster than the gravitational rate of downward movement of the unsupported portion of the sheet to assume only partially the transverse partial contour of said bed; and (d) cooling said sheet while in said transverse partial contour of said bed until it reaches a rigid condition.

3. The process of claim 1, wherein said glass sheet is fully supported by the cooling fluid emitted from said bed.

References Cited

UNITED STATES PATENTS 3,291,590  12/1966  McMaster _____ 65—25 X

ARTHUR D. KELLOGG, Primary Examiner

U.S. Cl. X.R.

65—107, 182